June 13, 1967 C. L. SUTULA ETAL 3,325,309
CLEANING POROUS SOLIDS
Filed Oct. 11, 1965
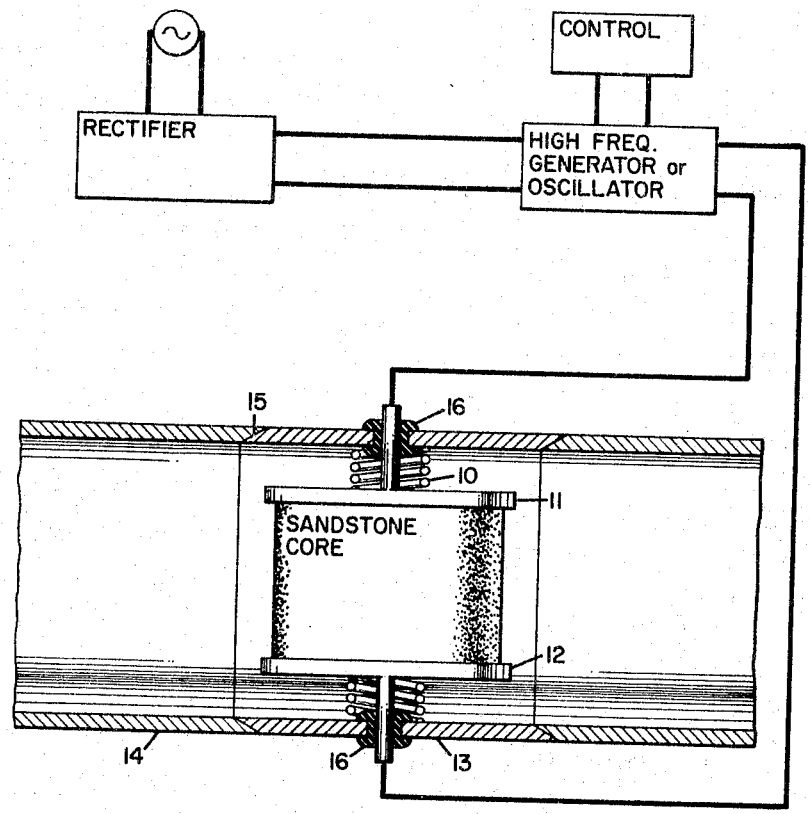
INVENTORS
CHESTER L. SUTULA
JAMES E. WILSON
BY
ATTORNEY

3,325,309
CLEANING POROUS SOLIDS
Chester L. Sutula, Littleton, and James E. Wilson, Denver, Colo., assignors to Marathon Oil Company, Findlay, Ohio, a corporation of Ohio
Filed Oct. 11, 1965, Ser. No. 494,512
2 Claims. (Cl. 134—1)

This invention relates to the cleaning of porous solids and more particularly to a process for volatilizing liquids within porous solids to force impurities from the solids.

It is often necessary to remove various materials from porous solids. Thus, to make geological studies, sandstone cores from petroleum reservoirs are often cleaned thoroughly and examined to determine the characterics of the formation. Likewise, solid catalysts used in the preparation of polymers, etc., often become substantially coated or impregnated with polymeric materials or coke-like materials.

Catalysts have been cleaned by burning the polymeric materials therefrom, but many catalysts cannot be so treated. Often cores must be treated with several types of solvents, surfactants, etc., in rather laborious processes to obtain the desired degree of cleanliness for engineering study.

The present invention provides a mechanism for readily cleaning porous materials wherein a porous solid is placed in a liquid and heated to a temperature above the boiling point of the liquid in the presence of a mass of cooler liquid. The gasification of the liquid within the porous solid creates a relatively high gas pressure within the porous solid which tends to eject contaminants and any remaining contaminated liquid from the porous solid. On exhaustion of liquids and gases in the porous solid, the pressure drops. Liquid re-enters and is again volatilized to cause a pumping action within the porous solid. If desired, the porous solid is then cooled in the liquid and the resulting cooling and reliquefication of gases remaining within the porous solid creates a vacuum causing the rapid entry of solvent into the pores of the solid.

Induction or dielectric heating are the preferred means of heating the porous solids without heating the solvents substantially. Normally, relatively conductive liquids would be utilized with nonconductive porous solids and dielectric heating, while relatively nonconductive liquids would be utilized with conductive porous solids and induction heating. Alternately, a mass of cool liquid of higher, lower or of substantially the same conductivity as the porous solid being cleaned can be flowed over the porous solid and the porous solid heated in the presence of this cool liquid. Such a situation is demonstrated in the embodiment of the attached drawing, which schematically illustrates a preferred form of the invention.

In carrying out this invention, a tarry hydrocarbon-containing sandstone core is placed between spring loaded electrodes 11 and 12 in section 13 of fluid flow circuit 14. Ground glass joints 15 and seal 16 prevent fluid leakage. A light hydrocarbon, for example, n-hexane, is passed through circuit 14. A rectified, alternating current is passed through a high-frequency generator or oscillator. The frequency of the output of the high-frequency generator or oscillator is controlled to obtain a core temperature slightly greater than the boiling point of n-hexane. Higher frequencies and resultingly higher temperatures could be used but would be less economic.

Once the core temperature has increased to above the boiling point of the solvent, the frequency is reduced so that the temperature of the core drops below 69° C. This causes the core to be cooled by the solvent and a resultant introduction of n-hexane into the core. A cyclic raising and lowering of the temperature causes alternating expulsion and introduction of n-hexane into the core in a consequent cleaning of the core. Auxiliary heating ca be utilized to maintain the cleaning fluid at a temperature near its boiling point, if desired, to reduce the cost of heating the porous solid.

The above-described embodiment of the invention can also be utilized for cleaning sintered bronze oil filters and the like. In such a case, the frequency of the current utilized would be reduced so that induction heating would take place. In a differing embodiment, a source of microwave energy or pulsed radio frequency energy can be used as a heat source.

The type of liquid utilized in this invention varies with the type of contaminant in the porous solid, the temperature at which the solid can be treated, the type of heat source available, etc. Thus, if the porous solid being cleaned, for example, a porous catalyst, is heat sensitive, a solvent would be used having a temperature less than that at which the catalyst is damaged. In other instances where the best available solvent is a monomer of the polymer being cleaned from the catalyst, the cleaning temperature should be less than that which will result in a substantial polymerization of the monomer. Thus, a catalyst for the preparation of butadiene would be cleaned at temperatures of about −5° C. where 1,3-butadiene is utilized as the cleaning solvent.

The liquid solvent utilized in this process may be acid or basic solutions where metallic impurities are a problem. It is obvious that such solutions should be solvents for the contaminants and not for the porous solid being cleaned.

Many factors enter into the selection of a cleaning fluid, but it is thought that anyone knowing the character of the porous solid and the impurity to be removed can rapidly select an appropriate fluid from those which are commercially available.

*Example I*

The positive and negative electrodes of a dielectric heater are used to clamp in place a core plug 1" x 1" in length and diameter. The electrodes are grooved in a grid to allow for some movement of fluids between the core and the electrodes. The electrode assembly holding the core is then placed in a container of n-heptane. Stirring is provided while the dielectric heater is on. Heating is continued until there is substantial expulsion of gas bubbles into the liquid n-heptane. The heater is then turned off and the core allowed to cool. This cycle is continued until the core is substantially clean.

*Example II*

A water-sensitive, fine grained sandstone core is treated by the process of Example I except that tetrachloroethane is used as the solvent and the heater is allowed to remain on until the temperature of the solvent reaches 120° C. The pulsing action of the fluid flowing into the capillary-like spaces between the sand grains and being expelled as a hot gas aids in cleaning the core.

Now having described the invention, what is claimed is:

1. The process of cleaning a porous solid comprising immersing the porous solid in a vaporizable cleaning liquid and substantially separately subjecting the porous solid in the liquid to a cyclic raising and lowering of temperature about the boiling point of the liquid to cause alternating expulsion of vapor from and introduction of liquid into the pores of the solid in a pulsing action while controlling the temperature of the solid during the heating and cooling phases such that it is slightly greater than the boiling point of the liquid during the heating phase and slightly lower than the boiling point of the liquid during the cooling phase, and maintaining the temperature of the liquid externally surrounding the porous solid during the heating and cooling phases at a temperature below but near its boiling point.

2. The process of claim 1 wherein one of the porous solid or the liquid surrounding the said porous solid is moved with respect to the other.

References Cited

UNITED STATES PATENTS 2,118,480  5/1938  Somes.
2,527,666  10/1950  Winter _____ 134—1
2,714,565  8/1955  Heywang _____ 134—30 X MORRIS O. WOLK, *Primary Examiner.*

J. ZATARGA, *Assistant Examiner.*